Jan. 3, 1928.  1,654,812
F. JENSEN
CENTRIFUGAL APPARATUS FOR AND PROCESS OF PURIFYING LIQUIDS
Filed Nov. 21, 1924
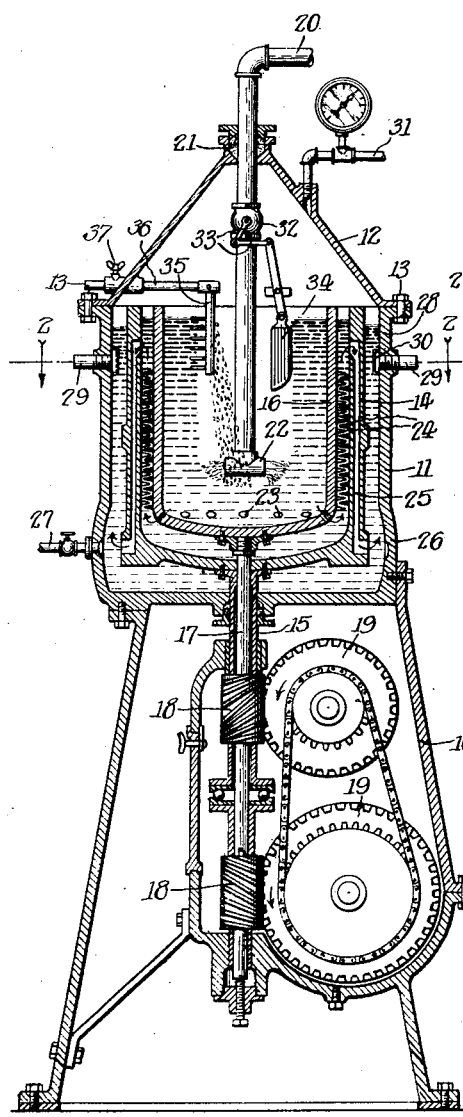
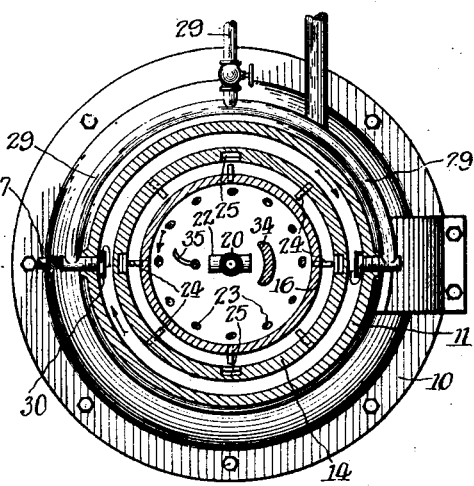
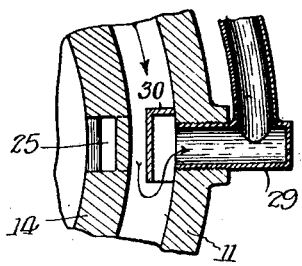
Witness:
R. Burkhardt.
Inventor:
Frederick Jensen,
By Cromwell, Greist & Warden
attys.

Patented Jan. 3, 1928.

1,654,812

UNITED STATES PATENT OFFICE.

FREDERICK JENSEN, OF BUFFALO, NEW YORK, ASSIGNOR TO BERT EUGENE HILL, OF CHICAGO, ILLINOIS.

CENTRIFUGAL APPARATUS FOR AND PROCESS OF PURIFYING LIQUIDS.

Application filed November 21, 1924. Serial No. 751,267.

This invention has to do with the art of refrigeration, and is particularly concerned with a novel process and apparatus for treating water to be used in the production of raw water ice.

In the production of ice from raw or undistilled water, it is essential that the air, solids and other objectionable matters present in the water be prevented from freezing into the ice, otherwise the ice, instead of being clear, as is required by the trade, will be white and will have a core which is impregnated with visible solids.

It has heretofore been the practice, in effecting the elimination of the objectionable matters, to bubble air upwardly in the water in the ice molding cans during the freezing operation, as the air serves to wipe the freezing surface of the ice clear of the objectionable matters and permits the water to freeze in a relatively pure state. The flow of air is continued until only a small core in the ice remains to be frozen, and then the highly impure water occupying the core is replaced by either distilled or fresh raw water and the core is frozen solid. While this practice will successfully accomplish the desired elimination, and is now being widely used in preference to all other proposed practices, it is very uneconomical, since it necessitates the costly installation, maintenance and operation of extensive equipment in the form of an air compressor, an air dehydrator, an elaborate system of air conduits leading to each of the ice molding cans, a core sucker pump, and power means for operating the various devices.

One object of the invention is to provide a novel process for economically and efficiently eliminating the objectionable matters from water which is to be used in the production of raw water ice.

Another object of the invention is to provide a novel apparatus with which the eliminating process of the invention may be advantageously practiced.

Other objects and advantages of the invention will be appreciated by those skilled in the art upon an understanding of the process and apparatus as had from the following disclosure.

The process of the invention contemplates the application of centrifugal force to raw water which is to be used in the production of raw water ice, whereby to remove from the water the objectionable matters such as gases and solids; and consists in rapidly whirling the water to separate centrifugally therefrom the objectionable matters at different points in the whirling body. The process more specifically consists in rapidly whirling the water at one point in a continuously moving stream of the same, withdrawing the centrifugally separated lighter matters from the whirling body of water adjacent the inner and upper portions thereof, withdrawing the centrifugally separated heavier matters from the whirling body adjacent the outer and lower portions thereof, and leading the stream of resultingly purified water from the whirling body adjacent the outer and upper portions thereof. The process also may advantageously include whirling the water first in one direction and then in another, and concurrently breaking up the whirling body to more readily liberate therefrom the air and other gases.

The treatment above described effectively serves to eliminate the objectionable matters from raw water, and the resulting water may be conducted to the ice molding cans and frozen solid while in a quiet state. It will be appreciated that the process is one which may be modified in various unessential details without departing from the novel application of principles underlying the same, and that all such modifications are contemplated by and come equally within the comprehensive scope of the appended claims.

The apparatus of the invention is presented in the accompanying drawings and in the following detailed description predicated thereon.

In the drawings—

Fig. 1 is a vertical section taken through the center of the apparatus;

Fig. 2 is a horizontal section taken on the line 2—2 of Fig. 1; and

Fig. 3 is a fragmentary view showing in enlarged detail a part of the apparatus shown in Fig. 2.

It will be observed in the drawings that the apparatus is mounted upon a hollow base 10 in which the operating mechanism for the apparatus may be advantageously housed. A cylindrical bowl 11 is secured upon the top of the base 10, and is provided with a conical cover 12 which is clamped tightly to the rim of the bowl by a plurality of circumferentially arranged bolts 13. The bowl 11 contains, in spaced concentric relation to the side walls thereof, a small cylindrical bowl 14 which is mounted for rotation upon the upper end of a upright tubular shaft 15 extending through the bottom of the bowl 11 into the base 10; and the bowl 14 in turn contains, in spaced concentric relation to the side walls thereoef, a still smaller cylindrical bowl 16 which is mounted for rotation upon the upper end of an upright shaft 17 extending through the bottom of the bowl 14 and through the tubular shaft 15. The bowls 14 and 16 are rotated rapidly in opposite directions through their respective supporting shafts 15 and 17 by means of worms 18 on the shafts meshing with interconnected and suitably driven worm gears 19. The bowl 14 preferably rotates in a clockwise direction, and the bowl 16 in a counterclockwise direction.

The raw water to be treated in the apparatus in accordance with the process already described is conducted to the apparatus by means of a pipe 20 which extends downwardly through a stuffing box 21 in the top of the cover 12 and terminates in a suitable discharging head 22 positioned at a central point near the bottom of the bowl 16. As the water discharges into the bowl 16, it is rapidly whirled in a counter-clockwise direction and forced centrifugally to assume a centrally hollowed form against the inner face of the rapidly rotating bowl 16. Much of the air entrained in the water is caused to move to the inner and upper surfaces of the water, where it is liberated, and the stream of water moves downwardly from the bowl 16 through a plurality of circumferentially arranged apertures 23 in the bottom of the same into the space between the bowls 16 and 14. The water then moves upwardly in the space between the oppositely rotating bowls, and, during such upward movement, is whirled in a clockwise direction by the more rapidly rotating bowl 14 and is violently cut and broken up by means of vertically arranged series of interfitting and oppositely moving knives 24 presented by the adjacent faces of the bowls 16 and 14. After the water has moved upwardly through the zone of the knives 24, more of the air agglomerated by the cutting action is liberated, and the water enters a number of downwardly extending ducts 25 in the side walls of the bowl 14, and is discharged at the bottom of the side walls into the annular space between the bowls 14 and 11. The water is then rapidly whirled in a clockwise direction, and the solids, which have been separated centrifugally from the water by the violent whirling actions of the apparatus, accumulate in the lower and slightly enlarged portion 26 of the bowl 11 and pass off from the apparatus through a pipe 27. The resulting water, which has then been purified by the elimination therefrom of the objectional matters, passes upwardly in the annular space between the bowls 14 and 11 and leaves the upper portion 28 of the bowl 11 through suitable pipes 29. The openings from the upper portion 28 of the bowl 11 into the pipes 29 are preferably shielded in the direction in which the water is whirling at that point by means of cup-shaped baffles 30 in order to cause the water to reverse its movement sharply before being withdrawn.

A suction pipe 31 may communicate with the conical space in the cover 12 above the three separated surfaces of the whirling body of water for the purpose of withdrawing the air and other gases which are caused to pass off from the water. An adjustable valve 32 may be positioned in the pipe 20 and connected through suitable operating levers 33 with a float 34 which rides upon the inner centrifugally hollowed surface of the water in the bowl 16, whereby to govern the flow of water to the apparatus with respect to the quantity of water undergoing purification in the apparatus. A comb-like member 35 may extend into the bowl 16 and there contact with the inner centrifugally hollowed surface of the water, whereby to spray the highly air laden surface water back again to its point of entry, and thus assist in the liberation of the air from the water. The member 35 may be secured to a rod 36 which is slidably mounted in the cover 12 and held in any desired position of adjustment by a wing bolt 37.

The process and apparatus of the invention, is inexpensive to install, maintain and operate, and will efficiently do the work of the extensive equipment heretofore considered necessary in the production of raw water ice. The process and apparatus may also be employed to advantage in the treatment of water to be used as boiler feed water, or in the treatment of any liquid from which it is desirable that gases or solids be removed prior to the use of the liquid.

Claims:

1. A method of removing the objectionable matters from water which is to be used in the production of raw water ice, which consists in rapidly whirling the water first in one direction and then in another, and rapidly cutting the whirling water, to separate centrifugally therefrom the objectionable matters.

2. A method of removing the objectionable matters from a continuously moving stream of water which is to be used in the production of raw water ice, which consists in rapidly whirling the water at one point in the stream, withdrawing the centrifugally separated lighter matters from the whirling body of water adjacent the inner and upper portions thereof, withdrawing the centrifugally separated heavier matters from the whirling body adjacent the outer and lower portions thereof, and leading the stream of resultingly purified water from the whirling body adjacent the outer and upper portions thereof.

3. A method of removing the objectionable matters from a continuously moving stream of water which is to be used in the production of raw water ice, which consists in rapidly whirling the water first in one direction and then in another, rapidly cutting the whirling water, withdrawing the centrifugally separated and mechanically liberated lighter matters from the whirling body of water adjacent the inner and upper portions thereof, withdrawing the centrifugally separated heavier matters from the whirling body adjacent the outer and lower portions thereof, and leading the stream of resultingly purified water from the whirling body adjacent the outer and upper portions thereof.

4. Apparatus for treating water which is to be used in the production of raw water ice, including a receptacle, an inlet in the receptacle for introducing thereinto raw water to be treated, means in the receptacle for rapidly whirling and cutting the water therein, and separate outlets in the receptacle for withdrawing therefrom respectively the centrifugally separated lighter matters, the centrifugally separated heavier matters, and the treated water.

5. Apparatus for treating water which is to be used in the production of raw water ice, including a substantially round receptacle, an inlet in the receptacle for introducing thereinto raw water to be treated, a rotatable bowl in the receptacle for rapidly whirling the water therein, means between the bowl and the receptacle for rapidly cutting the whirling water, and separate outlets in the receptacle for withdrawing therefrom respectively the centrifugally separated lighter matters, the centrifugally separated heavier matters, and the treated water.

6. Apparatus for treating water which is to be used in the production of raw water ice, including a substantially round receptacle, an inlet in the receptacle for introducing thereinto raw water to be treated, two concentrically spaced and oppositely rotatable bowls in the receptacle for rapidly whirling the water therein first in one direction and then in the other, means carried by the bowls between the same for rapidly cutting the whirling water, a suction outlet adjacent the top of the receptacle for withdrawing therefrom the gases separated from the water, another outlet adjacent the bottom of the receptacle for withdrawing therefrom the solids separated from the water, and another outlet in the receptacle intermediate the outlets described for leading therefrom the treated water.

7. In an apparatus of the class described, a receptacle, two bowls positioned concentrically therein, means for rotating the bowls in opposite directions, means for feeding the liquid to be treated into the inner bowl, means for withdrawing the treated liquid from the receptacle, and means for permitting the liquid to flow from the inner bowl into the outer bowl and from the outer bowl into the receptacle.

8. In an apparatus of the class described, a receptacle, a plurality of bowls positioned concentrically therein, means for rotating the bowls in different directions, and liquid inlet and outlet means in the apparatus so arranged as to cause liquid entering the apparatus for treatment to flow axially along the inner sides of each of the bowls and the receptacle in turn.

9. In an apparatus of the class described, a receptacle, two bowls positioned concentrically therein, means for rotating the bowls in opposite directions, means for feeding the liquid to be treated into the inner bowl, means for withdrawing the treated liquid from the receptacle, means for permitting the liquid to flow from the inner bowl into the outer bowl and from the outer bowl into the receptacle, and means carried by the bowls for comminuting the liquid in the space between the bowls.

10. In an apparatus of the class described, a receptacle, two bowls positioned concentrically therein, means for rotating the bowls in opposite directions, means for feeding the liquid to be treated into the inner bowl, means for withdrawing the treated liquid from the receptacle, means for permitting the liquid to flow from the inner bowl into the outer bowl and from the outer bowl into the receptacle, and projections on the outer face of the inner bowl and the inner face of the outer bowl for comminuting the liquid in the space between the bowls.

11. In an apparatus of the class described, a substantially cylindrical receptacle having an annular enlargement adjacent the bottom thereof, means for feeding liquid to be treated into the apparatus, an outlet communicating with the enlargement for withdrawing solids separated by centrifugal action from the liquid being treated, another outlet connected with the receptacle above the enlargement for withdrawing the treated liquid from the apparatus, and means in the receptacle for rapidly whirling the liquid therein.

12. In an apparatus of the class described, a receptacle, two substantially cylindrical bowls positioned concentrically therein with the sides and bottoms of the bowls in spaced relation to each other, liquid passages in the lower portion of the inner bowl opening into the lower portion of the outer bowl, and other liquid passages in the upper portion of the outer bowl opening into the lower portion of the receptacle.

In testimony whereof I have hereunto subscribed my name.

FREDERICK JENSEN.